(12) United States Patent
Douma et al.

(10) Patent No.: US 7,978,800 B2
(45) Date of Patent: Jul. 12, 2011

(54) CIRCUIT FOR CONVERTING A TRANSPONDER CONTROLLER CHIP OUTPUT INTO AN APPROPRIATE INPUT SIGNAL FOR A HOST DEVICE

(75) Inventors: Darin J. Douma, Monrovia, CA (US); Rudolf J. Hofmeister, Sunnyvale, CA (US); Stephen Nelson, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 1184 days.

(21) Appl. No.: 10/678,685

(22) Filed: Oct. 3, 2003

(65) Prior Publication Data

US 2004/0090274 A1   May 13, 2004

Related U.S. Application Data

(60) Provisional application No. 60/417,828, filed on Oct. 10, 2002.

(51) Int. Cl.
*H03D 3/24* (2006.01)
*H04L 7/02* (2006.01)
*H03L 7/00* (2006.01)

(52) U.S. Cl. ........ 375/354; 375/373; 375/359; 327/141; 327/2; 327/3

(58) Field of Classification Search .................. 375/376, 375/327, 354, 362, 359, 371, 373; 327/2, 327/3, 141, 147
See application file for complete search history.

(56) References Cited

U.S. PATENT DOCUMENTS

| | | | | |
|---|---|---|---|---|
| 3,812,430 A * | 5/1974 | Schmidt et al. | ............... | 375/356 |
| 4,238,770 A * | 12/1980 | Kobayashi et al. | ........... | 348/529 |
| 4,276,548 A * | 6/1981 | Lutz | ............................... | 342/103 |
| 5,079,770 A * | 1/1992 | Scott | ............................. | 370/536 |
| 5,886,748 A * | 3/1999 | Lee | ................................. | 348/614 |
| 6,212,239 B1 * | 4/2001 | Hayes | ............................ | 375/259 |
| 6,275,144 B1 * | 8/2001 | Rumbaugh | ................... | 375/259 |
| 6,305,848 B1 | 10/2001 | Gregory | | |
| 6,307,659 B1 | 10/2001 | Gilliland et al. | | |
| 6,320,686 B1 | 11/2001 | Schairer | | |
| 6,335,869 B1 | 1/2002 | Branch et al. | | |
| 6,347,954 B1 | 2/2002 | Jones et al. | | |
| 6,350,063 B1 | 2/2002 | Gilliland et al. | | |
| 2003/0195645 A1 * | 10/2003 | Pillay et al. | ..................... | 700/94 |

(Continued)

OTHER PUBLICATIONS

The 555 Timer, Tony van Roon, Apr. 14, 2002, http://web.archive.org/web/20020414103144/http://www.uoguelph.ca/~antoon/gadgets/555/555.html.*

(Continued)

*Primary Examiner* — David C. Payne
*Assistant Examiner* — Linda Wong
(74) *Attorney, Agent, or Firm* — Maschoff Gilmore & Israelsen

(57) ABSTRACT

A translation circuit for mediating between a fiber-optic controller chip and a host device. The translation circuit may be on a fiber-optic transponder. The controller chip includes a phase locked loop that outputs a short synchronization signal when a hunting frequency passes through a target data signal frequency while hunting for a data signal and outputs a synchronization signal when the phase locked loop is locked onto a data signal. The translation circuit distinguishes between the synchronization signals and generates a lock signal when the phase locked loop is locked onto a data signal, but does not when the hunting frequency passes through the target data signal frequency. The lock signal may be used by a host device into which the fiber-optic transponder has been installed. Errors from misinterpreted signals can thus be mitigated.

21 Claims, 5 Drawing Sheets

U.S. PATENT DOCUMENTS

2004/0042504 A1*   3/2004   Khoury et al. .............. 370/518
2004/0179138 A1*   9/2004   Wang et al. .................. 348/569
2005/0220051 A1*  10/2005   Lavean ....................... 370/330

OTHER PUBLICATIONS

Eletronics Tutorials: Transistors, Nov. 15, 2000, http://web.archive.org/web/20001203135600/http://www.electronics-tutorials.com/basics/transistors.htm.*

Phase-Locked Loop Protocol Scheme for a Contaminated Synchronization Field. IBM Technical Disclosure Bulletin, May 1990, US vol. No. 32 Issue No. 12, p. No. 336-337 Publication-Date: May 1, 1990.*

The 555 Timer, Tony van Roon, Apr. 14, 2002. http://web.archive.org/web/20020414103144/ http://www.uoguelph.ca/~antoon/gadgets/555/555.html.*

Phase-Locked Loop Protocol Scheme for a Contaminated Synchronization Field. IBM Technical Disclosure Bulletin, May 1990, US vol. No. 32, Issue 12, No. 336-337 Publication Date: May 1, 1990.*

Electronics Tutorials: Transistors, Nov. 15, 2000, http://web.archive.org/web/20001203135600/http://www.electronics- tutorials.com/basics/transistors.htm.*

* cited by examiner

CIRCUIT FOR CONVERTING A TRANSPONDER CONTROLLER CHIP OUTPUT INTO AN APPROPRIATE INPUT SIGNAL FOR A HOST DEVICE

CROSSREFERENCE TO RELATED APPLICATIONS

This application claims the benefit of U.S. Provisional Patent Application, Ser. No. 60/417,828, filed Oct. 10, 2002, titled A CIRCUIT FOR CONVERTING A TRANSCEIVER CONTROLLER CHIP OUTPUT INTO AN APPROPRIATE INPUT SIGNAL FOR A HOST DEVICE which is hereby incorporated by reference.

BACKGROUND OF THE INVENTION

1. The Field of the Invention

The invention relates generally to optoelectronic/optical transponders and particularly to optoelectronic/optical transponder modules including a controller chip that interprets signals differently than a host device.

2. The Relevant Technology

Digital data can be efficiently propagated through a fiber-optic cable using light signals from light emitting diodes or lasers. To send data on a fiber-optic cable, the data is typically converted from electronic data generated by computers to optical data that can be propagated onto the fiber-optic cable. When data is received from a fiber-optic cable, the data must be converted from optical data to electronic data so that it can be received by a computer.

A transmitter optical subassembly (TOSA) is often used to convert electronic data to optical data for transmission on a fiber-optic cable. A TOSA uses the electronic data to drive a laser diode or light emitting diode to generate the optical data. When optical data is converted to electronic data, a receiver optical subassembly (ROSA) is used. The ROSA has a photo diode that, in conjunction with other circuitry, converts the optical data to electronic data. Because most computers both transmit and receive data, most computers need both a TOSA and a ROSA to communicate through fiber-optic cables. A TOSA and ROSA can be combined into an assembly generally referred to as a transponder.

Optical transponders are used for receiving and transmitting data between electronic hosts such as computers using an optical network. Generally, optical transponders are located at the interface of an optical network and an electronic host to receive optical data from the network, convert the optical data to electronic data, and to pass on the electronic data to the host. Likewise, optical transponders also receive electronic data from the host, convert the electronic data to optical data, and transmit the optical data through an optical network to another host. Optical transponders commonly come in the form of a transponder module that can be mounted on a motherboard of a host.

A controller chip located in the transponder module manages the data conversion between optical data and electronic data. One function of the controller chip is clock extraction, or extraction of a reference clock signal that is embedded in the data. Clock extraction allows the controller chip to provide the reference clock signal to the host device so that the data can be accurately read at appropriate times by the host device. Another function of the controller chip is sampling the data. Once the clock is extracted and the data is sampled, the clock reference signal is used as a reference for converting the sampled data into synchronized data that can be easily read by the host device. This synchronized data is synchronized to the reference clock signal that is at a predetermined target frequency (e.g., 10 Gigabits per second).

Although the target frequency of the incoming data is generally known, the controller chip must determine the exact moments at which data can be sampled to detect each data bit. To make this determination, the controller chip may use a phase-locked-loop (PLL) to "hunt" a range of frequencies in the incoming data stream to locate a signal. When the PLL is in hunting mode, the PLL searches within a predetermined frequency range that includes the target frequency. When the reference clock signal is found, the PLL locks onto the reference clock signal so that from that point on, data can be sampled regularly at the target frequency to read every data bit.

Manufacturers of the controller chip may configure the controller chip to produce a logical "0" when the PLL hunting frequency is different from the target frequency of the incoming data, and to produce a logical "1" when the PLL hunting frequency overlaps with the target frequency. This type of logic is commonly referred to as "asserted high" and "deasserted low." Thus, if the predetermined frequency is 10 Gigabits per second and the PLL is hunting in the frequency range of 9.5 Gigabits per second to 10.5 Gigabits per second, a logical "1" is produced for a short period of time at a regular interval, or each time the PLL oscillates through the target frequency of 10 Gigabits per second.

Alternatively, manufacturers of the controller chip may configure the controller chip to produce a logical "1" when the hunting frequency is different than the target frequency and a logical "0" when the hunting frequency overlaps with the target frequency. This type of logic may commonly be referred to as "asserted low" and "deasserted high." The asserted logical value is the value indicating that the hunting frequency is at the target frequency whereas the deasserted logical value is the value indicating that the hunting frequency is not at the target frequency. In either case, the controller chip produces a number of false short lock signals, whether they be asserted high or low, in hunting mode that may be passed to the host device. The host device may misinterpret these signals. As such, the host device may try to read data from the controller chip when no valid data exits.

BRIEF SUMMARY OF THE INVENTION

These and other limitations are overcome by the present invention which relates to systems and methods for interfacing between controller chips and host devices in fiber-optic transponders.

Accordingly, in one embodiment of the invention, a fiber-optic transponder is configured to connect to a host device. The fiber optic transponder includes a controller chip that includes a phase locked loop. The phase locked loop operates in a hunting mode and a locked mode. In the hunting mode, the phase locked loop asserts a short synchronization signal when a hunting frequency passes through a data signal frequency. In locked mode, the controller chip produces a synchronization signal that is constant so long as the phase locked loop is locked onto the data signal.

The fiber-optic transponder further includes a timing circuit that measures the period of time that a synchronization signal is asserted. If the synchronization signal is asserted for a sufficiently long period of time, the timing circuit produces a lock signal that is output for use by the host device. Advantageously, the short synchronization signals that may falsely indicate to the host device that the phase locked loop has locked onto a data signal can be filtered out. The synchronization signals caused by the phase locked loop locking onto a data signal last for a sufficiently long period of time that they are not filtered out by the timing circuit.

In another embodiment of the invention, a fiber-optic transponder is configured to connect to a host device. The fiber optic transponder includes a controller chip that includes a phase locked loop. The phase locked loop operates in a hunting mode and a locked mode.

The fiber-optic transponder further includes a translation circuit that asserts a logic signal when a synchronization signal is asserted by the controller chip when the phase locked loop is locked onto a data signal. The translation circuit does not assert the logical signal when the synchronization signal is asserted when a hunting frequency passes through a data signal frequency in hunting mode. Advantageously, the translation circuit translates to synchronization signals asserted by the controller chip to an appropriate signal for use by the host device. Specifically, the translation circuit removes signals from the controller chip that may falsely indicate that the phase locked loop has locked onto a data signal frequency.

In yet another embodiment of the invention, a method of mediating signals from a controller chip used in a fiber-optic transponder with a host device is disclosed. The method includes receiving an asserted synchronization signal from a phase locked loop, where the phase locked loop is incorporated on the controller chip. The method further includes determining if the synchronization signal is caused by the phase locked loop when the phase locked loop has locked onto a data signal as opposed to a synchronization signal caused by the phase locked loop passing a hunting frequency through a data signal frequency. The method further includes outputting a lock signal if the phase locked loop has locked onto a data signal. Advantageously, this method helps to mediate signals output by a controller chip for use by a host device by removing signals output by the controller chip that may be misinterpreted by the host device.

These and other advantages and features of the present invention will become more fully apparent from the following description and appended claims or may be learned by the practice of the invention.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawing depict only typical embodiments of the invention and are, therefore, not to be considered limiting of its scope. The invention will be described and explained with additional specificity and detail through the use of the accompanying drawings in which.

DETAILED DESCRIPTION OF THE INVENTION

A transponder used in fiber-optic networks is configured to function as an interface for a host device for communicating on such a network. The transponder includes circuitry to receive optical signals and convert them to electronic signals for use by the host device. The transponder further includes circuitry to receive electronic signals from the host device and to convert them to optical signals that can be propagated onto a fiber-optic network.

Some embodiments of the invention may be implemented in a transponder for translating or mediating signals internal to the transponder to the host device. The transponder is configured to connect to the host device, such as through a computer bus or by any other feasible method. The transponder includes a controller chip that has a phase locked loop (PLL) circuit that includes a hunting mode and a locked mode. The hunting mode searches a range of frequencies to lock onto a data signal received by the controller chip. While in hunting mode, the controller chip may briefly assert a short synchronization signal as the PLL hunting frequency passes through the frequency of the data signal. In lock mode, the controller chip asserts a constant synchronization signal so long as the PLL is locked onto the data signal.

Embodiments of the transponder may also include timing circuitry. The timing circuitry measures the period of time that a synchronization signal is asserted from the controller chip in the transponder. If the synchronization signal is asserted for at least some specific period of time, some embodiments of the invention assert a lock signal that can be passed to the host device. False synchronization signals are not passed to the host device.

Figure 1:
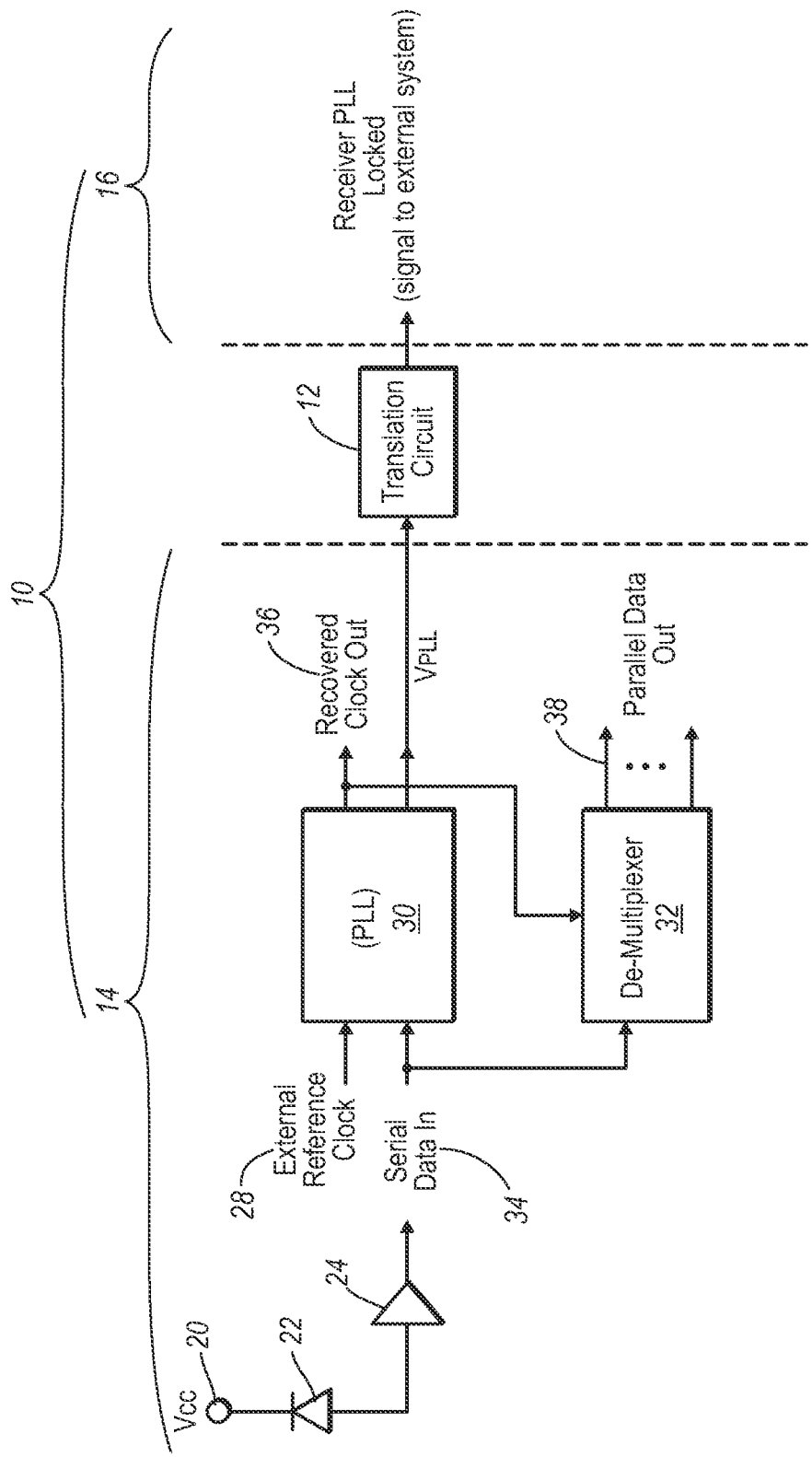
FIG. 1 depicts a section of an optical transponder module including a signal translation circuit in accordance with aspects of the present invention.

FIG. 1 schematically depicts an optical transponder section 10 including a translation circuit 12. A "translation circuit" as used herein, refers to a circuit that receives signals from a controller chip region 14 and translates the signals into signals that will be properly interpreted by a host device region 16. As shown in FIG. 1, translation circuit 12 is located between controller chip region 14 and host device region 16.

In this example, controller chip region 14 includes a voltage source 20 connected to the cathode of photodiode 22. Photo diode 22 receives optical signals, that include embedded clock signals, and generates electric signals. The electric signals are amplified by a trans-impedance amplifier 24 coupled to the anode of photodiode 22 to form a serial data input signal 34. Serial data input signal 34 and an external reference clock signal 28 from an external clock are fed into a phase locked loop (PLL) unit 30, which hunts for transitions (e.g., rising edges such as when a logical signal goes from low to high) in serial data input signal 34. Notably, in some embodiments of the invention the external reference clock can be omitted depending on the characteristics of the PLL used.

Once a clock signal 36 is recovered from the serial data input signal 34, PLL unit 30 feeds recovered clock signal 36 into a demultiplexer 32. Recovered clock signal 36 is used by demultiplexer 32 to convert the data in serial data input signal 34 into a parallel data signal 38 that is used by the host device. Namely, using extracted clock signal 36, demultiplexer 32 can look at serial data input signal 34 at the appropriate times to read the serial data bits. These serial data bits can thus be appropriately extracted from the serial data input signal 34 and subsequently organized into parallel data where multiple signals are used to transfer the same data as was encoded on the serial data input signal with fewer bits per second on each of the parallel signals relative to the bits per second of the serial data input signal 34. PLL unit 30 also produces a synchronization signal $V_{PLL}$ that indicates when the PLL unit is at a target frequency or has locked onto a data signal.

Figure 2:
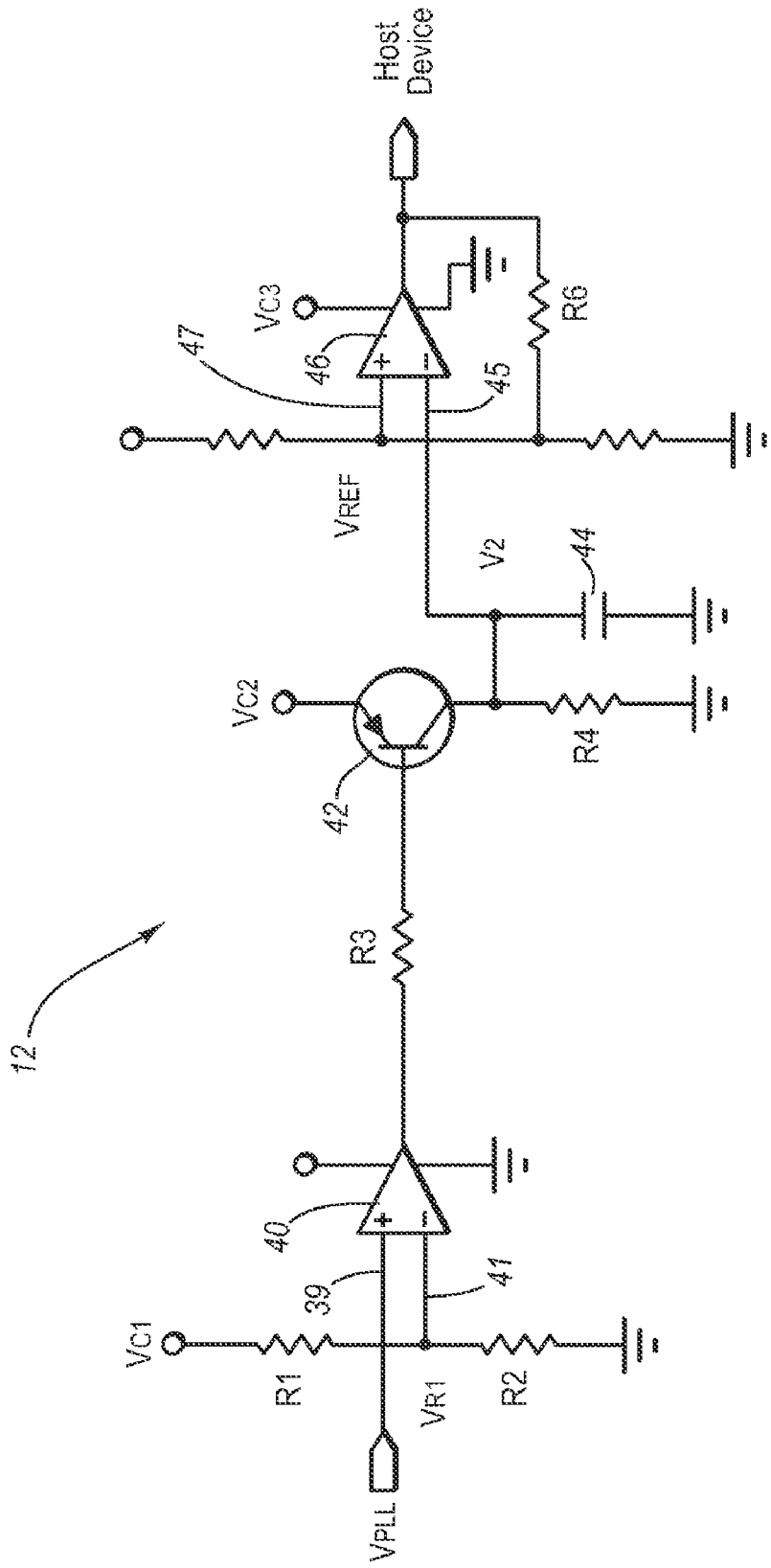
FIG. 2 depicts one embodiment of a signal translation circuit.

FIG. 2 depicts one embodiment of translation circuit 12. The output $V_{PLL}$ from PLL unit 30 (see FIG. 1) is fed into the non-inverting input 39 of an input level detector 40. In this particular embodiment, input level detector 40 is a differential voltage amplifier or a comparator. Input level detector 40 amplifies any difference between voltage signals input at non-inverting input 39 and inverting input 41. Input level detector 40 shown in FIG. 2 has an almost infinite gain such that when the voltage at non-inverting input 39 is greater than the voltage at inverting input 41, the input level detector saturates, meaning that the output voltage is at its maximum value. This maximum value may be interpreted as a logical "high" or "1". Thus, by choosing a reference signal $V_{R1}$ that is lower than the expected logical "high" voltage of $V_{PLL}$, and higher than the expected logical "low" voltage of $V_{PLL}$, input level detector 40 will output a logical "high" value when the logical value of $V_{PLL}$ is high. In one embodiment, the reference signal $V_{R1}$ is about halfway between the expected logical "high" and the expected logical "low" of $V_{PLL}$. The reference signal $V_{R1}$ is fed into inverting input 41 of input level detector 40. This reference signal may be determined by a first applied voltage $V_{C1}$ and a voltage divider including resistors R1 and R2. Specifically, R1 and R2 are chosen such that a certain percentage of $V_{C1}$ is dropped by R1 and the remainder of $V_{C1}$ is dropped by R2. Thus by choosing appropriate values of R1 and R2, the reference signal fed into the inverting input 41 of input level detector 40 may be chosen. The output of input level detector 40 is a logical "high" voltage which represents a logical "1" when the voltage at the non-inverting input exceeds the voltage at the inverting input. The output of input level detector 40, when at a logical "high," indicates that the PLL unit 30 is at the target frequency.

The output of input level detector 40 is coupled to the base of transistor 42. Transistor 42 turns on when the output of input level detector 40 is low and turns off when the output of input level detector 40 is high. When transistor 42 is turned on, capacitor 44 charges and develops the maximum voltage across the capacitor very quickly because the capacitor 44 is at that time coupled to a positive power supply $V_{C2}$ through the very low impedance of the transistor 42 in its on state. When transistor 42 is turned off, such as when $V_{PLL}$ is at a logical "high" causing the output of input level detector 40 to be high, capacitor 44 discharges slowly through R4. The impedance of R4 being higher than the impedance of the transistor in its "on" state causes capacitor 44 to discharge at a much slower rate than the rate at which it charges. Charging capacitor 44 may be comparable to resetting a timer each time $V_{PLL}$ goes low. The transistor 42 may be used as a switch to reset the timer. Capacitor 44 discharging through R4 may be comparable to running a countdown timer.

Capacitor 44 is coupled to the inverting input 45 of comparator 46. Comparator 46 is a differential amplifier similar to input level detector 40. Comparator 46 detects whether there is a signal by comparing the voltage level of capacitor 44 to $V_{REF}$, which is coupled with its non-inverting input 47. $V_{REF}$, may be generated in one embodiment, by using a voltage divider such as is shown in FIG. 2. Comparator 46 produces a "high" voltage, representing a "1" if the voltage at its inverting input 45 drops below $V_{REF}$. A comparator 46 output of "1" indicates to the host device that a data bit has been detected.

When transistor 42 is turned off for at least a period time that is approximately equal to the amount of time it takes for capacitor 44 to discharge to a voltage that is less than $V_{REF}$; comparator 46 will sense this reduction in charge and set the output of comparator 46 to "1", indicating to the host device that a signal has been detected. Due to the presence of capacitor 44, comparator 46 does not produce a "1" every time input level detector 40 produces a "1". Rather, comparator 46 produces a "1" only when the output of input level detector 40 lasts for a minimum period of time. The period of time may be specified by choosing appropriate values for resistor $R_4$ and capacitor 44. Resistor $R_4$ and capacitor 44 may be chosen so the time for capacitor 44 to discharge to a level below $V_{REF}$ is longer than the duration of frequency overlap that occurs during hunting. The host device will receive a signal "1" only when PLL unit 30 is "locked," or when the clock signal has been found.

The loop from the output of comparator 46 to the non-inverting input of comparator 46 includes a positive feedback resistor R6 that provides a hysteresis mechanism. The hysteresis mechanism creates a threshold that should be met for switching from "0" to "1" and "1" to "0." For example, if the output to the host device is at a logical "1", the hysteresis mechanism may be designed to require that the voltage across the capacitor 44 rise to a level, for example, 100 mV above $V_{REF}$ before the comparator 46 changes logical states. The hysteresis mechanism may be necessary because noise can cause the differential voltage at the inverting and non-inverting inputs of comparator 46 to fluctuate rapidly. This rapid fluctuation at the inputs might cause undesirable output toggling at the output of comparator 46.

Because the non-inverting input 39 of input level detector 40 has a high input impedance (e.g., 1 TΩ), the output impedance of the preceding system, such as PLL unit 30, has little effect on translation circuit 12. Likewise, the output of comparator 46 has a low impedance so that the succeeding system, such as the host device, will be able to receive the output signal.

Figure 3:
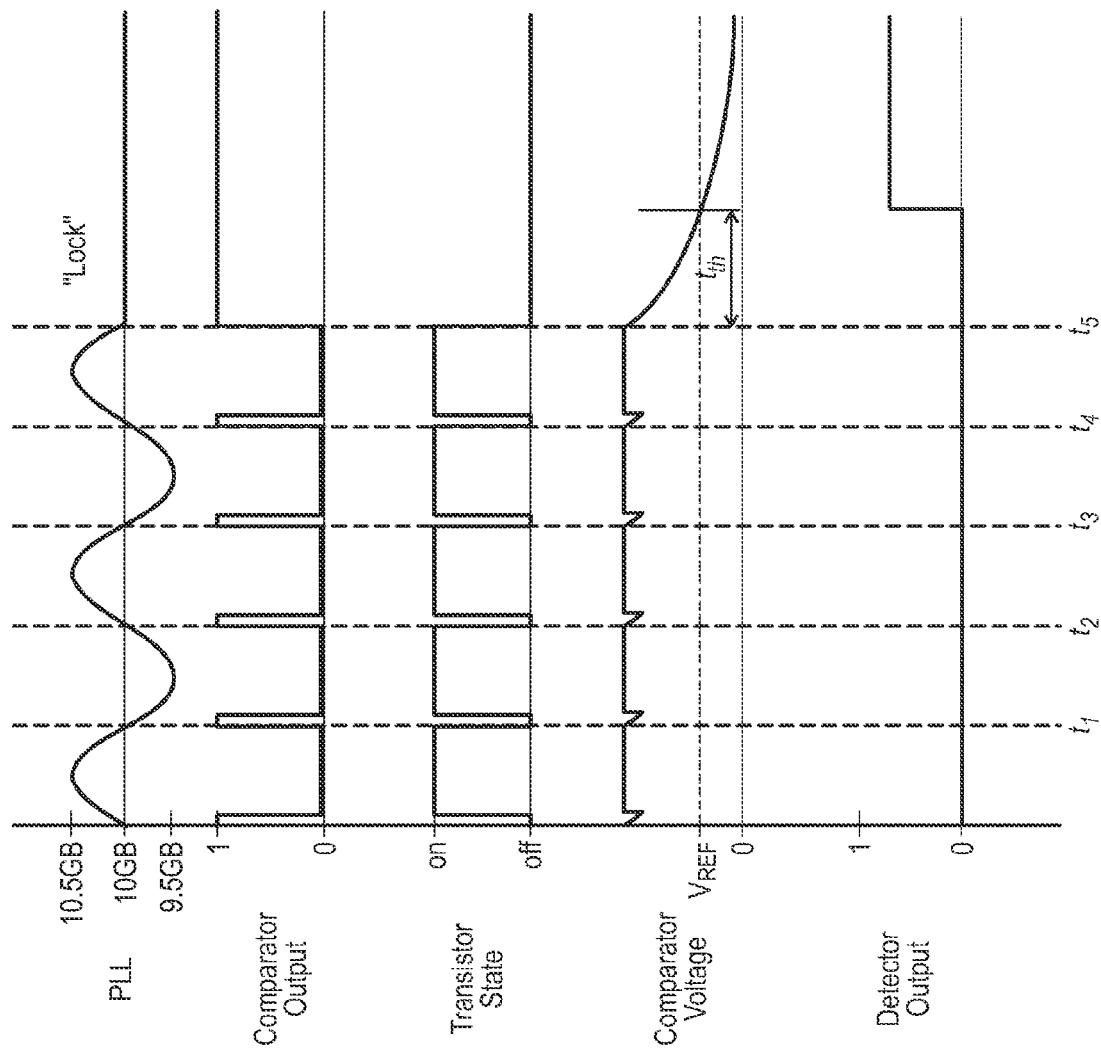
FIG. 3 depicts the functional relationships among components of the signal translation circuit of FIG. 2.

FIG. 3 illustrates graphically the states of PLL unit 30, the output of input level detector 40, the state of transistor 42, the voltage of capacitor 44, and the output of comparator 46 in the embodiment of FIG. 2. When PLL unit 30 hunts between 9.5 GB and 10.5 GB for a signal at the 10 GB target frequency as shown at the top of FIG. 3, the output of input level detector 40 becomes a logical "1" every time PLL unit 30 is searching at the 10 GB target frequency. In the example shown, the PLL unit 30 searches in the 10 GB target frequency at times t1, t2, t3, and t4. Whenever the output of input level detector 40 is "1", transistor 42 turns off and causes capacitor 44 to discharge. However, because PLL unit 30 stays at the 10 GB frequency only briefly when it is hunting, capacitor 44 can discharge only a small amount before the transistor 42 turns back on and charges the capacitor (i.e. resets the timer). As a result, capacitor 44 does not discharge for a long enough duration to reach $V_{REF}$ (i.e. the threshold voltage to cause the comparator 46 output to saturate) while PLL unit 30 is hunting. Because capacitor 44 does not reach $V_{REF}$ during hunting, comparator 46 generates a logical "0" until PLL unit 30 "locks." In this manner, the host device is prevented from receiving a false logical "1" every time the PLL unit 30 searches for a signal in the target frequency.

At t5, when PLL unit 30 "locks" onto the embedded clock signal, PLL unit 30 remains at 10 GB. The output of input level detector 40 remains at a logical "1", causing transistor 42 to remain turned off. When transistor 42 is turned off for a long enough period ($t_{th}$) capacitor 44 decays below $V_{REF}$, which in turn causes comparator 46 to produce a logical "1" state letting the host device know that a signal has been detected. This way, the host device does not get a false asserted lock signal at t1, t2, t3, and t4. Time $t_{th}$ should be longer than the time interval between t1 and t2, between t2 and t3, etc.

Various modifications are possible for the translation circuit 12 depicted in FIG. 2 and FIG. 3. For example, comparator 46 may not be necessary if the input characteristics of the host device that receives the output from comparator 46 include a sharp detection threshold. One of the purposes of comparator 46 is to convert a slow-changing signal (e.g., discharging capacitor 44) into an abrupt output ("1" or "0") by supplying a sharp detection threshold against which the slow-changing input signal is measured. Thus, if the host device component that receives signals from comparator 46 has a sharp input, it can be used as a detection threshold, making comparator 46 unnecessary. The lock signal may be the voltage across the capacitor 44 falling below a threshold level. In this case, the lock signal is asserted low.

Further, embodiments of the translation circuit may also eliminate the input level detector 40 and associated circuitry depending on the characteristics of the signal $V_{PLL}$. Additionally, depending on the signals supplied by the PLL and required by the host device, the components shown in FIG. 2 may be substituted for other appropriate components. For example, transistor 42 may be a NPN transistor that charges the capacitor when a "high" logical voltage signal is applied to the base instead of the PNP transistor shown that charges the capacitor when a "low" logical voltage is present at the base of the transistor. Further, the transistor 42 may be a field effect transistor (FET) instead of the bipolar junction transistor (BJT) shown. Various other modifications may also be implemented although not enumerated here. Some of these modifications are used to accommodate the different logical levels that may be used by PLL circuits and host devices. PLL circuits may supply or accept signals with logical levels such as TTL, LVTTL, H-CMOS TTL, LV H-CMOS TTL and other signals that have different signal requirements. The PLL circuits and host devices may also use or support devices with open collector outputs. The PLL circuits and host devices may not consistently use "asserted high" or "asserted low" logic such that an appropriate configuration of components should be used depending on the assertion levels of the logic.

Figure 4:
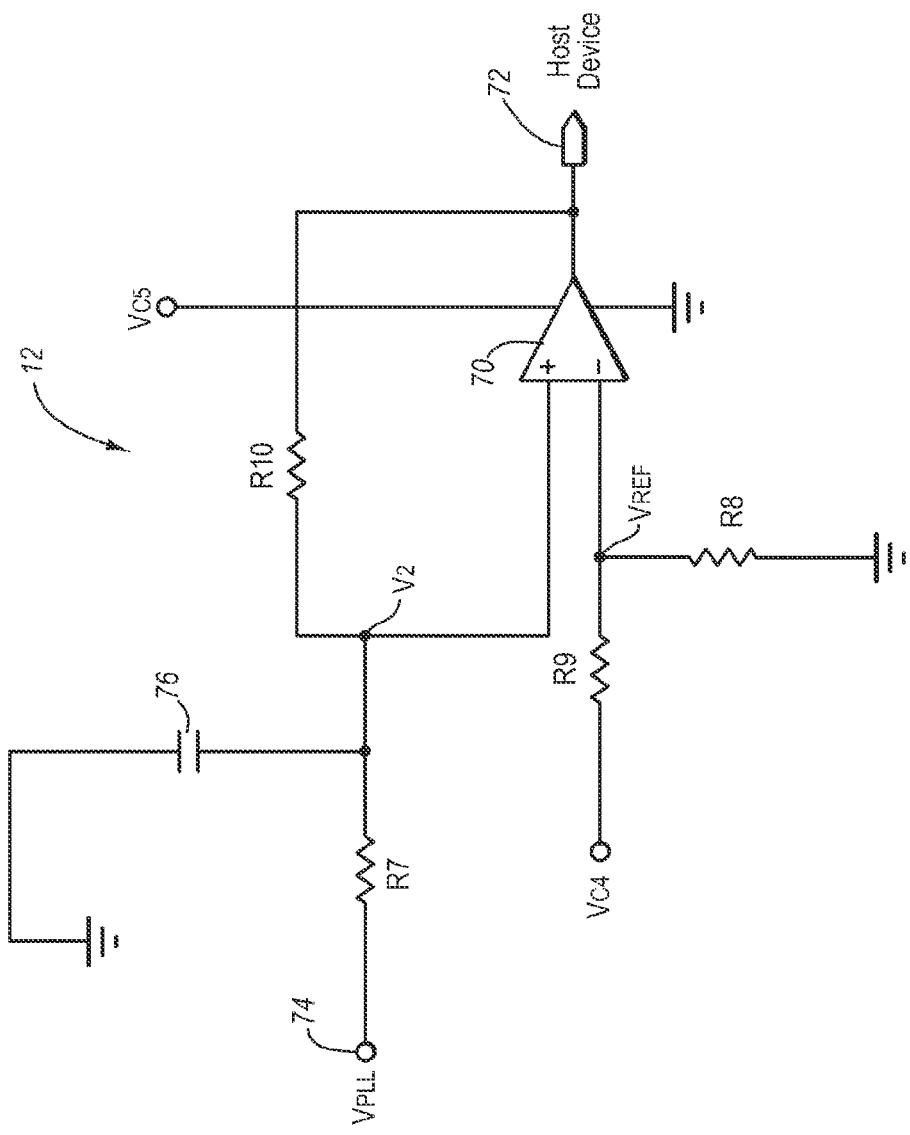
FIG. 4 depicts an alternative embodiment of the signal translation circuit.

FIG. 4 depicts an alternative embodiment of translation circuit 12 wherein the rapid charge mechanism and input level detector 40 of the previous embodiment are omitted. This alternative embodiment is useful when the duty cycle of the PLL unit output signal is sufficiently low during "hunting" that it can be easily distinguished from the "locked" state based on average signal alone. A comparator 70, which acts similarly to comparator 46 of the embodiment in FIG. 2, compares the voltages at its two inputs and outputs a signal 62 to a host device. The comparator 70 may be configured to assert a lock signal when the voltage $V_2$ at its non-inverting input is higher than the voltage $V_{REF}$ at its inverting input. The host device interprets an asserted lock signal from comparator 70 as a signal $V_{PLL}$ output from the PLL unit 30 (see FIG. 1). In this particular embodiment, a PLL unit output of a "0" indicates that the PLL unit 30 is at the target frequency and a PLL unit output of a "1" indicates that the PLL unit 30 is not at the target frequency. In other words, the PLL unit asserts low. The output from the PLL unit 30 feeds into translation circuit 12 through a node 74 and a resistor R7. In this example, $V_2$, the voltage across capacitor 76, is the average voltage over time of $V_{PLL}$. If the $V_{PLL}$ is mostly high, but occasionally low as it would be for a low asserted "hunting" signal then the average would be higher. However, if the $V_{PLL}$ signal is low for an extended period, as it is when "locked" then the average would become lower. Thus the comparator determines whether the average is low (locked) or high (hunting) by comparing it to $V_{REF}$. How long it takes to go from "hunting" to "locked" can be adjusted by changing the values of capacitor 76 and resistor R7. If the PLL unit 30 is "hunting", there will be more "1"s entering node 74 than when the PLL unit 30 is "locked" because a series of "0"s are generated when the PLL unit 30 is locked in this embodiment. The voltage $V_{REF}$ at the inverting input is set so that $V_{REF}$ is higher than $V_2$ if the number of "0"s at node 74 exceeds a predetermined percentage of a data stream. Thus, if PLL unit 30 is locked and the number of "0"s in the data stream exceeds the predetermined percentage, $V_{REF}$ is higher than $V_2$. When $V_{REF}$ is higher than $V_2$, comparator 70 asserts a lock signal. On the other hand, if PLL unit 30 is hunting and the data stream includes many "1"s with intermittent "0"s, such that the number of "0"s do not exceed the predetermined percentage, $V_{REF}$ is lower than $V_2$, and comparator 70 does not assert a lock signal. The value of $V_{REF}$ is set by a fourth applied voltage $V_{C4}$ and by the resistances of R8 and R9 that together form a voltage divider.

The capacitor 76 creates a time lag between when PLL unit 30 first begins to output "0"s and when $V_2$ drops below $V_{REF}$, at which point comparator 70 generates a signal detection notice. When the signal coming in from PLL unit 30 first begins to output a series of "0"s, capacitor 76 discharging raises the voltage $V_2$ so that $V_2$ is higher than $V_{PLL}$. Only after PLL unit 30 stays at the target frequency long enough to take the capacitor voltage to $V_{REF}$, is the comparator 70 triggered to generate a signal detection notice.

The comparator 70 has a hysteresis mechanism similar to comparator 46 of FIG. 2. The hysteresis mechanism includes the loop from the output of comparator 70 to the non-inverting input of comparator 70 that includes a positive feedback resistor R10. As in the embodiment of FIG. 2, this hysteresis mechanism is necessary to prevent signal toggling at the output of comparator 70 because capacitor 76 discharges gradually while comparator 70 presents a sharp threshold.

While the above embodiments of the invention have illustrated the translation circuit 12 as embodying various analog timer circuits, other types of circuits may be used. For example, digital timing circuits can be used to distinguish between synchronization signals that are caused by a hunting frequency passing through a data signal frequency and synchronization signals that are caused by a phase locked loop being locked onto a data signal. Further, the circuits do not necessarily have to be timing circuits, but may be other types of circuits such as those that examine frequency or phase response or other types of characteristics.

Figure 5:
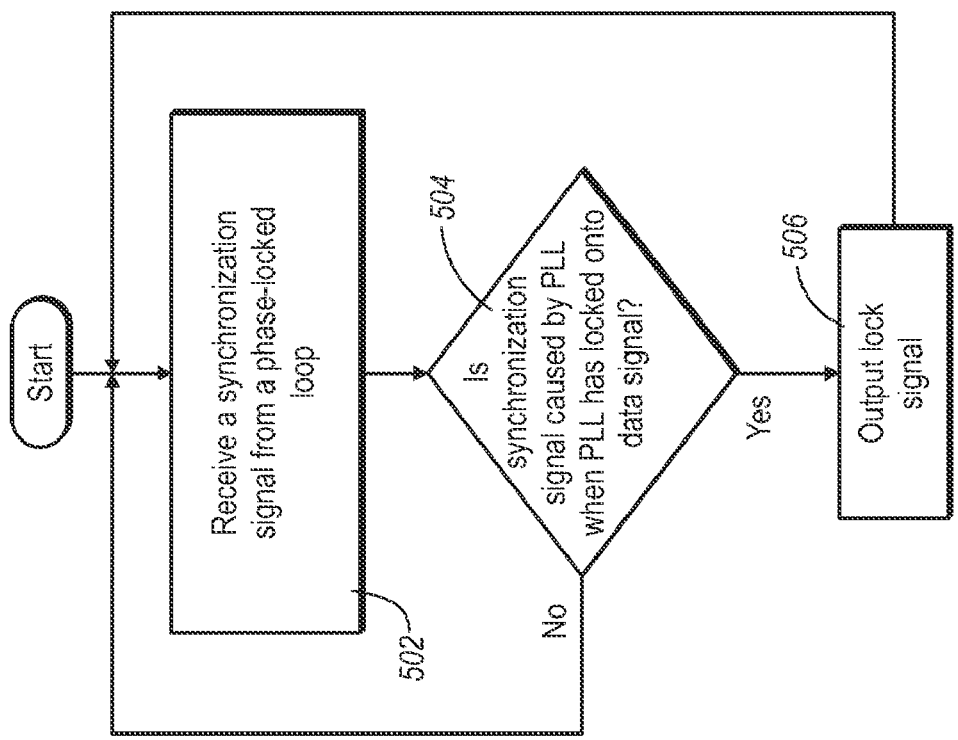
FIG. 5 depicts a method of mediating signals from a phase locked loop with a host device.

Referring now to FIG. 5 a method of mediating signals from controller chips used in a fiber-optic transponder with a host device is shown. FIG. 5 includes receiving a synchronization signal from a phase locked loop (502). The synchronization signal may be one that is caused by the phase locked loop in a hunting mode passing through a data signal frequency as discussed above in conjunction with FIGS. 1 through 3. Alternatively, the synchronization signal may be one that is caused by the phase locked loop being locked onto a data signal.

The method of FIG. 5 then determines if the synchronization signal is caused by the phase locked loop when the phase locked loop has locked onto a data signal (504). In one embodiment this may include measuring the time that the synchronization signal is asserted and/or deciding that the synchronization signal is caused by the phase locked loop when the phase locked loop has locked on to a data signal if the synchronization signal is asserted for a least some specified period of time. Determining if the synchronization signal is caused by the phase locked loop when the a phase locked loop has locked onto a data signal (504) may be accomplished by using a translation circuit such as translation circuit 12 shown in FIGS. 1, 2 and 4 or any other appropriate circuit.

If the synchronization signal is caused by the phase locked loop when the phase locked loop has locked onto a data signal, then a lock signal is output (506). The lock signal may be one that is useful by a host device to which the transponder is connected.

The method shown in FIG. 5 may further include comparing the asserted synchronization signal with a reference signal to produce logical signals used for determining if the synchronization signal is caused by the phase locked loop when the phase locked loop has locked onto a data signal (504). Comparing the asserted synchronization signal to the reference signal may in one embodiment invention be accomplished by an input level detector such as the input level detector 40 shown in FIG. 12.

The method shown in FIG. 5 may further include comparing the lock signal with a reference signal to produce a logical signal useful by host device coupled to the fiber-optic transponder. Comparing the lock signal with a reference signal may be accomplished by using a comparator.

The method shown in FIG. 5 may further include changing the logical level of the logical signal useful by a host device when the value of the lock signal changes by some value greater than a hysteresis threshold value. As described above, this helps to prevent noise from causing a change in the logical level of the logical signal useful by a host device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that asserts a false synchronization signal at times when data is not present, a fiber-optic transponder that produces a lock signal only when data is present in a serial data signal, the transponder comprising:
   a controller chip that includes a phase locked loop adapted to operate in a hunting mode and a locked mode, wherein the phase locked loop is further adapted to assert a synchronization signal in the hunting mode when a hunting frequency passes through a data signal frequency and wherein the phase locked loop is further adapted to keep the synchronization signal asserted as long as the phase locked loop is locked onto the serial data signal;
   a timing circuit adapted to measure a period of time that the synchronization signal is asserted using a capacitor and resistor network and to produce a lock signal if the synchronization signal is asserted for at least a specified period of time, the timing circuit including a comparator that compares a first reference signal with a signal from the capacitor and resistor network used to measure the period of time that the synchronization signal is asserted, the comparator outputting the lock signal based on the comparison; and
   a demultiplexer arranged to receive a clock signal from the phase locked loop, the demultiplexer being configured to convert the serial data signal to a parallel data signal based on the clock signal.

2. The transponder of claim 1, wherein the timing circuit comprises a transistor for resetting the timing circuit.

3. The transponder of claim 2, wherein the transistor is at least one of a field effect transistor, a PNP bipolar junction transistor, and NPN bipolar junction transistor.

4. The transponder of claim 1, further comprising an input level detector that compares the synchronization signal with a second reference signal and produces logical signals that are fed into the timing circuit.

5. The transponder of claim 1, wherein the timing circuit outputs the lock signal to a host device.

6. The transponder of claim 5, wherein the comparator includes feedback that changes a logical level of the lock signal output to the host device when the value of the lock signal changes by some value greater than a hysteresis threshold value.

7. A fiber-optic transponder comprising:
   an output adapted to couple to a host device;
   a controller chip having a phase locked loop that is adapted to operate in a hunting mode in which the phase locked loop briefly asserts a synchronization signal when a hunting frequency passes through a data signal frequency that corresponds to a rate of data encoded in a data signal, the phase locked loop also being adapted to operate in a locked mode in which the phase locked loop asserts the synchronization signal so long as the phase locked loop is locked onto the data signal; and
   a translation circuit including:
     a level detector that compares the synchronization signal with a first reference signal to produce a logical signal based on the comparison;
     a timer adapted to measure a period of time that the logical signal is asserted to produce a timer signal; and
     a comparator that compares the timer signal with a second reference signal to produce a lock signal for use by the host device,
     wherein a logic level of the lock signal is asserted when the phase locked loop is locked onto a data signal for the period of time measured by the timer and is de-asserted when the phase locked loop asserts the synchronization signal in hunting mode.

8. The fiber-optic transponder of claim 7, wherein the comparator includes feedback that changes a logical level of the lock signal when the value of the lock signal changes by some value greater than a hysteresis threshold value.

9. The fiber-optic transponder of claim 7, wherein the data signal is an electronic data signal, the fiber-optic transponder further comprising circuitry to convert an optical data signal to the electronic data signal.

10. The fiber-optic transponder of claim 7, wherein the data encoded in the data signal is digital data encoded with data encoding circuitry.

11. A method of mediating signals from a controller chip used in a fiber-optic transponder with a host device, the method comprising:
   receiving a synchronization signal from a phase locked loop, the phase locked loop disposed on the controller chip;
   obtaining an average of the synchronization signal over a period of time;
   comparing the average of the synchronization signal with a reference signal to determine whether the synchronization signal is caused by the phase locked loop locking onto a data signal or by the phase locked loop passing a hunting frequency through a data signal frequency;
   asserting a lock signal if the phase locked loop has locked onto the data signal; and
   in response to the asserted lock signal:
     sampling data from the data signal;
     extracting a clock signal from the data signal; and
     using the extracted clock signal as a reference for converting the sampled data into synchronized data to be read by the host device.

12. The method of claim 11, further comprising changing a logical level of the lock signal when the value of the lock signal changes by some value greater than a hysteresis threshold value.

13. The method of claim 11, wherein obtaining the average includes creating a time lag between when a change occurs in the synchronization signal and when the change is taken into account by the average of the synchronization signal.

14. In a system that generates a synchronization signal to indicate the presence of a data signal, a translation circuit comprising:
   a timing circuit adapted to measure a period of time that the synchronization signal is asserted using at least a capacitor arranged to discharge when the synchronization signal is asserted and to charge when the synchronization signal is not asserted, wherein the timing circuit is further adapted to generate an output signal having a voltage across the capacitor; and
   a comparator circuit adapted to compare the output signal with a reference signal such that a lock signal is not asserted unless the comparison of the output signal with the reference signal indicates that the period of time that the synchronization signal is asserted exceeds a minimum period of time.

15. The translation circuit of claim 14, wherein the timing circuit comprises a transistor that is controlled by the synchronization signal for resetting the timing circuit such that the capacitor discharges.

16. The translation circuit of claim 15, wherein the transistor is at least one of a PNP bipolar junction transistor, an NPN bipolar junction transistor, and a field effect transistor.

17. The translation circuit of claim 15 wherein the capacitor is coupled to the transistor such that current flows through the transistor to charge the capacitor when the synchronization signal is not asserted at a rate faster than a rate at which the capacitor discharges through a resistor coupled thereto, and wherein the comparator is adapted to assert the lock signal when the reference signal exceeds the voltage across the capacitor.

18. The translation circuit of claim 14, wherein the comparator circuit includes feedback that changes a logical level of the lock signal useful by the host device when the value of the lock signal changes by some value greater than a hysteresis threshold value of the comparator circuit.

19. The translation circuit of claim 18, wherein the hysteresis threshold value of the comparator circuit prevents the lock signal from changing logic levels until the output signal of the timing circuit changes by an amount greater than the hysteresis threshold value.

20. The translation circuit of claim 18, further comprising an input level detector that passes the synchronization signal to the timing circuit when the synchronization signal exceeds a reference voltage.

21. The translation circuit of claim 14, wherein the capacitor is arranged such that a voltage across the capacitor is an average of the synchronization signal over a period of time.

* * * * *